Jan. 16, 1951          A. C. SMITH          2,538,389

AIRCRAFT LANDING GEAR

Filed Nov. 6, 1948

Alvin C. Smith
*INVENTOR.*

BY

Patented Jan. 16, 1951

2,538,389

UNITED STATES PATENT OFFICE 2,538,389

AIRCRAFT LANDING GEAR

Alvin C. Smith, Columbus, Ohio, assignor to Curtiss-Wright Corporation, a corporation of Delaware Application November 6, 1948, Serial No. 58,729

15 Claims. (Cl. 244—103)

The present invention relates to running gear and more particularly to improvements in aircraft landing gears.

Inasmuch as elements which protrude into the airstream from aircraft increase the drag and resistance and accordingly tend to decrease the speed of the aircraft, it has been common practice in aircraft operating at higher speeds to make the landing gear retractable or to otherwise reduce its exposure to the airstream. The drag-to-speed ratio of such protruding elements as landing gears is however decidedly lower on slower speed aircraft and on such aircraft it has been found that the drag of the exposed landing gear is not always sufficient to warrant the expense and weight of the mechanism necessary to make the landing gear retractable. In certain types of fixed or rotary wing aircraft such as cargo, passenger, troop-carrying or assault aircraft wherein the disposable or the pay-load is a primary factor, much of the additional weight required for a retractable landing mechanism could well be utilized in the form of additional pay-load if the gear were not retractable. As heavier and larger aircraft are built, it has been found that proportionately larger landing wheels have become necessary to properly support the aircraft during take-offs and landings and it has also been found that the high concentrated loads from such larger wheels are frequently beyond the bearing capacities of many airport runways which were designed for smaller airplanes. The present invention is directed to an improved type landing gear which is semi-fixed, and not of the fully retractable type, and which materially reduces the drag of an exposed type landing gear while providing adequate landing means for both normal and emergency landings.

My improved landing gear consists essentially of a semi-fixed exposed landing gear embodying a cantilevered shock-absorbing strut for resiliently absorbing the shocks imparted to a multiple wheeled unit in which the wheels are laterally disposed in side-by-side relationship for a normal landing. The improved landing gear also embodies a streamlined fairing about the landing wheels, and strut portion, and includes a skid element for continuing the fairing of the wheel fairing member as well as providing an emergency landing surface. The improved gear assembly also incorporates means for turning the movable portion of the landing gear unit from its low-drag forwardly aligned streamlined position in which it is capable of emergency landings, to an athwart-ship disposition in which the multiple wheels are in position for a normal landing. The improvement also embodies means for withdrawing and extending the multiple wheels with respect to the wheel fairing, means for the withdrawal and extension of the skid element, as well as other improved arrangements and details of the respective landing gear elements.

It is accordingly one of the primary objectives of the present invention to provide a semi-fixed non-retractable landing gear which is particularly adapted for lower speed aircraft such as cargo, passenger, troop-carrying or assault type aircraft. It is a further object to provide an improved landing gear of this type capable of sustaining high loads by the use of a plurality of relatively smaller diameter ground engaging wheels. It is a corollary object to provide an improved non-retractable landing gear in which the ground contact area is materially increased for larger aircraft without the necessity of using larger size wheels.

It is also a major object of the present invention to provide a semi-fixed landing gear which is movable between an extended landing position and an extended flight position to materially reduce the drag of the landing gear as compared to a fixed non-retractable landing gear of the same load capacity. A further objective resides in the provision of a landing gear of an improved multiple wheel type in which the wheels are mounted in the landing position laterally or athwart-ship on a common transverse axis. A further object lies in the provision of such a multiple wheeled landing gear which is capable of being rotated into a flight position in which the common axis is longitudinally disposed to reduce the drag of the wheel elements and the fairing enclosure. Another object resides in providing a semi-fixed landing gear in which the landing gear is movable between flight and landing positions, is withdrawable within its fairing enclosure and also in which an emergency skid can selectively be provided either as a fairing or as an emergency landing surface in the flight position of the landing gear, or retracted to expose the landing wheels in the normal landing position of the gear.

Other objects and advantages of the present invention will become apparent to those skilled in the art after reading the present description taken in conjunction with the accompanying drawings forming a part hereof, in which.

Figure 1:
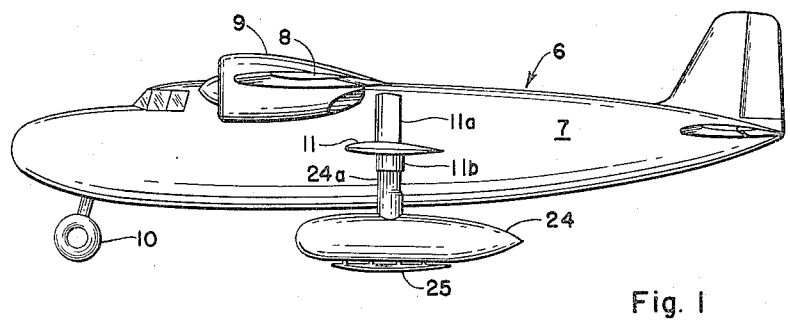
Fig. 1 is a side elevational view of an airplane showing a form of the improved landing gear in the flight position.
Figure 2:
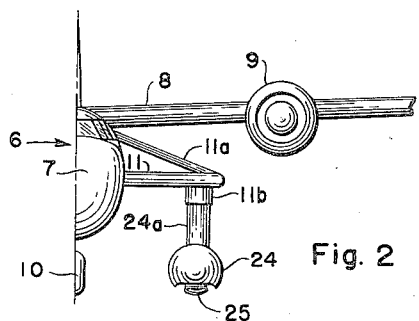
Fig. 2 is a fragmentary front elevational view of the airplane and landing gear in the position shown in Fig. 1.
Figure 3:
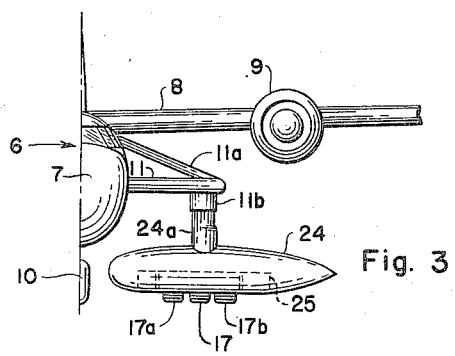
Fig. 3 is a similar front elevational view showing the landing gear adjusted into its athwartship landing position.

Referring now to Figs. 1, 2 and 3, the numeral 6 represents an aircraft having a central fuselage portion 7 and transverse wings 8 on which are mounted power plants 9 for the propulsion of the aircraft. The complete landing gear for the aircraft 7 includes a conventional nose wheel 10 and a pair of laterally disposed landing gear units of the improved type disposed aft of the center of gravity of the airplane and supported laterally from both sides of the fuselage 7 by means of the strut framework 11 and 11a. The landing gear is preferably enclosed within the fixed fairing depending portion 11b which is attached to and suspended from the faired strut 11; and the movable fairing 24a about the shock absorbing strut assembly 13 from which the ground engaging wheels 17, 17a and 17b, and the skid 25 are rotatably supported. The wheels 17, 17a and 17b are faired within an elongated streamlined housing 24 which is fixedly attached to the vertical strut fairing portion 24a and is adapted to move both axially and rotationally with respect to the substantially vertical axis of the depending fairing portion 11b.

Figure 4:
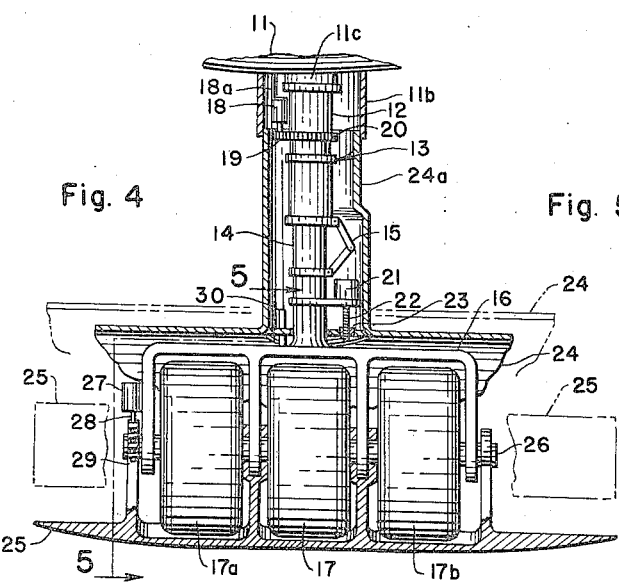
Fig. 4 is an enlarged cross-sectional view of the landing gear in the position of Fig. 1.
Figure 5:
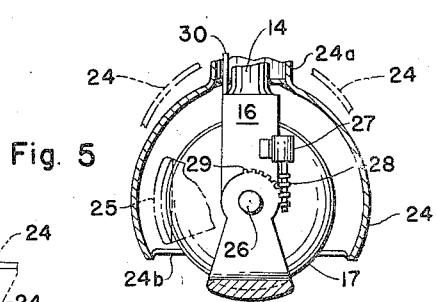
Fig. 5 is a sectional view of the landing gear as taken along the lines 5—5 of Fig. 4.

Referring now to Figs. 4 and 5, and more particularly to Fig. 4, the shock absorbing strut assembly 13 is rigidly supported in a cantilever arrangement on a substantially vertical axis from the rigid outrigger framework 11 and 11a. The strut assembly 13 is preferably of the conventional oleo-pneumatic type having an upper cylinder portion 12 which is journalled for rotational movement about its vertical axis within the bearing portion 11c fixed to the supporting framework 11; the fixed bearing portion within which it is journalled being indicated at 11c. The strut assembly 13 includes the piston portion 14 which is articulated or pivotally linked to the cylinder portion 12 by the nutcracker linkage or torque scissors 15, preventing relative rotation while permitting axial telescoping. The lower end of the piston element 14 of the strut assembly is fixedly attached to the fork or yoke member 16 which is suitably bored to provide for the axle 26 on which the three landing wheels 17, 17a, and 17b are rotationally mounted.

An electric motor 18 is fixedly supported by the bracket 18a from the fixed structure 11, the motor carrying on its drive shaft a pinion 19 which is in meshing engagement with the gear 20 fixedly mounted upon the cylinder portion 12 of the strut assembly 13. Rotation of the motor 18 and its drive pinion 19 accordingly imparts rotational movement to the cylinder portion 12, through the gear 20 to which it is fixed, and since the nutcracker linkage 15 imparts like rotational movement to the piston portion 14, the entire movable portion of the landing gear may be caused to rotate from the position shown in Fig. 2 to that shown in Fig. 3, and vice versa, by such operation of the motor 18. This rotational movement takes place through only 90° in partially rotating the landing gear from the longitudinal position shown in Fig. 2 to the transverse position shown in Fig. 3 and the landing gears on both sides of the aircraft are preferably operated simultaneously in order that the drag and turning forces about the vertical axis of the aircraft are maintained in balance and do not disturb the control of the aircraft. Such partial rotation is accommodated by the rotation of the cylinder portion 12 within its fixed journal 11c, and the vertical fairing portion 24a is permitted to freely rotate within the fixed depending portion 11b. The shock absorbing assembly 13 is shown in Fig. 4 in its extended unloaded condition as would occur in flight and in which the piston portion 14 is withdrawn or extended from within the cylinder portion 12. When the landing gear is loaded, that is, when the airplane is upon the ground and its load is transmitted through the landing gear units, whether through the wheels or the emergency skid, the piston portion 14 will be telescoped upwardly within the relatively fixed cylinder portion 12 and suitable clearance is provided within the depending fairing 11b for the upwardly moving vertical fairing 24a.

The landing wheels 17, 17a and 17b are raised or lowered within the wheel fairing 24 by means of the electric motor 21 which is fixedly mounted upon the piston portion 14 and has a running thread 22 on its drive shaft, which forms a jack-screw in engagement with an internally threaded nut element 23 fixedly attached to the continuation of the upper surface of the wheel fairing 24. Accordingly, as the motor 21 is operated the wheel fairing 24 is moved upwardly causing the wheels 17, 17a and 17b to project further below the lower edge 24b of the fairing; and conversely as the motor is operated in the opposite direction the fairing 24 is caused to be lowered with respect to the wheels 17, 17a and 17b and the rotatably attached skid 25. In order that the fairing 24 be kept in alignment rotationally about the same axis with the strut an anti-torque pin 30 projects upwardly from the yoke element 16 through an aligned aperture within the upper surface of the wheel fairing member 24 to prevent rotation of the fairing about the vertical axis of the strut and to thereby prevent radial or bending loading of the jack-screw shaft 22 and its engaged nut element 23.

In the position shown in Fig. 4, the entire movable portion of the landing gear and its fairing has been rotated by the motor 18 into the longitudinal position shown in Fig. 1, and the wheel fairing 24 has been lowered from its upper position shown in the construction lines to the full line position in which the wheels 17, 17a and 17b are housed within the upper portion of the fairing. It will also be understood that in the athwart-ship position of the landing gear as prepared for a normal landing as in Fig. 3, the fairing 24 has been raised to its uppermost position to permit full exposure of the wheels 17 below its lower edge 24b for contact with the ground. The emergency skid 25 is preferably rotatably mounted upon the axle 26 for the wheels 17 and is provided for its operation with an electric motor 27 having a worm shaft 28 in meshing engagement with a worm gear sector 29 carried by one of the end bearing brackets of the skid. Accordingly, operation of the motor 27, which is fixedly mounted upon the wheel 16, causes rotational movement of the skid 25 from its extended position beneath the wheels 17, 17a and 17b as shown in the full lines in Figs. 4 and 5, to the retracted position alongside the wheels and within the fairing 24 as shown in the construction lines in these figures.

The electric motors 18, 21 and 27 are preferably controlled from the cockpit of the aircraft through suitable control switches, and are also preferably automatically stopped or cut-off by suitable micro- or limit-switches such that once the controls are initiated the source of current to the respective motors will be interrupted when the part moved by that motor reaches the desired limit position. The motors 18, 21 and 27 may preferably be hooked up in such manner that they operate simultaneously, i. e. when it is desired to prepare for a landing and rotate the landing gear from the longitudinal position of Fig. 2 to the landing position of Fig. 3, the motor 18 will accomplish the desired 90° rotation, the motor 21 will draw the wheel fairing 24 upwardly to expose the wheels 17, 17a and 17b simultaneously as the motor 27 will cause the skid 25 to be rotated into its retracted or side position. Likewise as the aircraft takes off and the landing gear is moved into its low drag flight position of Fig. 2, the jointly operated motors 18, 21 and 27 will simultaneously rotate the assembly, extend the skid 25 and lower the wheel fairing member 24 such that the wheels 17, 17a and 17b are housed in the upper portion of the fairing. It may also be desirable under certain conditions that the motor 18 be operated separately from the motors 21 and 27 such that the foregoing movements are carried out after the movable assembly is rotated through 90° between its flight and landing positions.

Inasmuch as relatively low, and for the most part balanced, loads are imposed on the motors 18, 21 and 27 they may be of relatively small output and weight, as compared to the single but much larger motors which are required to retract a landing gear of similar load capacity. In view of the low output of these motors, and the fact that the three separate movements of the portions of the landing gear assembly need not necessarily be carried out simultaneously, the motors can either be jointly or separately operated to suit the individual requirements of the operation of the airplane and to permit maintenance of its electric load within controllable limits.

While the improved semi-fixed landing gear has been shown and described herein as applied to the main landing gear units of a tricycle type landing gear, it will be understood that the improvements are also applicable to the nose wheels of certain heavier and slower types of aircraft. It should also be pointed out that the present landing gear is also applicable to landing gear systems in which the main landing units are disposed forward of the center of gravity of the airplane and the fuselage portion aft of the center of gravity is supported upon a tail wheel, and that the tail wheels of certain types of aircraft may also embody the teachings of the present invention. In each case, the landing gear unit is faired in its flight condition such that its resistance is materially reduced and while in that flight position the skid portion 25 is always in position for an emergency landing. In those cases where the pilot realizes that an emergency landing is imminent and he determines that a landing upon the skids is preferable to that upon the wheels, where time permits he may operate the motor 21 to withdraw the wheel housing 24 upwardly to thereby project the skids 25 a greater distance below the lower edge 24b of the wheel fairing.

It should also be noted that while three landing wheels have been shown and described the advantages of the improved arrangement may be gained in installations utilizing two or more wheels in each landing gear unit. It may also be desirable to support the landing gear units directly from the fuselage or wing structure or from other parts of the aircraft.

Other forms and modifications of the present invention both with respect to its general arrangement and the details of its respective parts, are intended to come within the scope and spirit of this invention, as more particularly defined in the appended claims.

I claim:

1. In an aircraft landing gear, a strut rotatably mounted upon a substantially vertical axis upon the aircraft structure, a plurality of landing wheels rotatably mounted upon said strut on a single substantially horizontal axis, an elongated wheel fairing supported from said strut enclosing said landing wheels, said wheel fairing having its length extending in substantially the same direction as the said horizontal axis of rotation of said landing wheels, and means for rotating said strut, said landing wheels and said fairing about said strut axis such that said landing wheels are rotated from their landing position on a transverse axis of rotation to a flight position on a longitudinal axis in which the said fairing length extends in the direction of flight of the aircraft for the fairing of said transversely disposed landing wheels.

2. In an aircraft landing gear, a non-retractable strut assembly mounted for rotation upon the aircraft structure about its own axis, said strut assembly having ground-engaging means operatively associated therewith, a fairing attached to said strut assembly enclosing said ground-engaging means, the length of said fairing extending transverse to the normal fore and aft axis of said ground-engaging means in its operative landing position, and means for rotating said strut assembly, said ground-engaging means and said fairing about said strut axis from a landing position in which the ground-engaging means is aligned with the fore and aft direction of landing movement to a flight position in which said ground-engaging means is transverse to the direction of flight and the length of said wheel fairing is aligned with said direction of flight.

3. In an aircraft landing gear including a strut assembly mounted for rotation about its own axis, ground-engaging means rotatably mounted upon said strut assembly upon a horizontal axis, an elongated fairing supported from said strut assembly with its length extending in the same direction as said horizontal axis, and means for rotating said strut assembly, said ground-engaging means and said fairing about said strut axis arranged to move said strut assembly from a landing position in which said fairing is transverse to the flight direction of the aircraft through a right angle to a flight position in which said fairing is in parallelism with the flight direction of the aircraft.

4. In an aircraft landing gear of the non-retractable type, a strut assembly mounted upon the aircraft for rotation about its own axis, said strut assembly having ground-engaging means operatively associated therewith, an elongated fairing enclosing said ground-engaging means, said fairing extending transversely to the normal fore and aft direction of said ground-engaging means in its landing position, said ground-engaging means presenting a lesser frontal area in its transverse position than in its landing position, means for lowering and raising said fairing with respect to said ground-engaging means, and means for rotating said strut assembly, said ground-engaging means and said fairing about said strut axis from a landing position of said ground-engaging means in which said fairing is transversely disposed, to a longitudinal flight position of both said fairing and said ground-engaging means in which the frontal area exposed to the airstream is materially reduced from that of said landing position.

5. In an aircraft landing gear including a strut having a longitudinal axis, mounting means for said strut arranged for rotation about said strut axis and with respect to the aircraft, said strut having ground-engaging means operatively associated therewith, an elongated fairing enclosing said ground-engaging means mounted for rotation with respect to the aircraft, said ground-engaging means extending transversely of the longitudinal axis of said enclosing fairing, and means for rotating said ground-engaging means and said fairing about the axis of said strut between a landing position of said ground-engaging means in which said fairing offers maximum resistance to flight and a flight position in which said fairing offers a lesser resistance to flight.

6. In an aircraft landing gear of the non-retractable type, a strut assembly rotatably mounted on a substantially upright axis upon the aircraft structure, said strut assembly having ground-engaging means operatively associated therewith, an elongated fairing enclosing said ground-engaging means mounted for co-axial rotation with said strut assembly, and means for rotating said strut assembly, said ground-engaging means and said fairing about said strut axis from a landing position of said ground-engaging means in which said fairing is disposed transverse to the direction of flight of the aircraft to a flight position in which said fairing is directed into the direction of flight.

7. In an aircraft landing gear of the non-retractable type, a strut mounted upon the aircraft for rotation about its own axis, a horizontal axle element supported from said strut, ground-engaging elements operatively associated with said strut for rotation upon said axle element, a skid element operatively supported upon radial arms extending from said axle element, the length of said skid extending parallel to the axis of said horizontal axle element, means for rotating said skid from an inoperative position laterally of said ground-engaging elements to a position beneath and normal to the planes of rotation of said ground-engaging elements for a landing upon said skid element and means for rotating said strut about said strut axis for alignment of the planes of rotation of said ground-engaging elements with the direction of flight for a landing upon said ground-engaging elements in a laterally disposed position of said skid element.

8. In an aircraft landing gear installation, an aircraft structure, a strut assembly rotatively mounted upon said aircraft structure for rotation about the longitudinal axis of said strut assembly, an axle element carried by a lower portion of said strut assembly, a plurality of ground-engaging elements rotatively carried by said axle element for rotation about a substantially horizontal axis, a fairing supported from said strut assembly and enclosing said ground-engaging elements, the length of said fairing extending in the direction of said axle element axis such that said ground-engaging elements rotate within and transversely of the length of said fairing, a skid element pivotally supported from said axle element having its length extending parallel to the length of said fairing and in the direction of said axle element axis, means for rotating said strut assembly from the operative position of said ground-engaging element in which said fairing extends transverse to the direction of flight in its drag-producing position to an aligned position of said fairing with the direction of flight in an inoperative position of said ground-engaging elements and means to rotate said skid element from a retracted position to an extended position beneath and parallel to said axle element in an operative position of said skid element in which it is aligned with the length of said fairing and with the direction of flight of the aircraft.

9. In a non-retractable aircraft landing gear, a strut mounted upon the aircraft structure for partial rotation about its own axis, an axle element carried by a lower portion of said strut, a plurality of ground-engaging wheels rotatably mounted upon said axle element, a landing skid pivotally mounted for rotation about said axle element in the direction of rotation of said ground-engaging means, the length of said landing skid extending parallel to the axis of said axle element, means for rotating said strut and said ground-engaging wheels, axle element and landing skid carried thereby about said strut axis for directing said ground-engaging wheels into their landing direction with said skids transversely disposed to the direction of flight at an upper of its rotated positions, and means operatively associated with said skids for its movement from said upper position to an operative position beneath said ground-engaging wheels.

10. In aircraft, landing wheel means having greater width than diameter, a fairing for enclosing said wheel means, said wheel means and said fairing arranged with respect to each other such that the width of said wheel means is housed within the length of said fairing and a maximum resistance to forward flight is presented in the operative landing alignment of said wheel means with said fairing transversely disposed, and means to rotate said wheel means and said fairing together into a position with respect to the aircraft in which said wheel is inoperative for landing purposes but is faired by the length of said fairing in alignment with the direction of flight for materially reducing said resistance to forward flight.

11. In an aircraft landing gear arrangement, a plurality of laterally disposed wheel elements rotatably mounted upon the aircraft upon a horizontal axis, an elongated fairing rotatably mounted upon the aircraft upon a substantially vertical axis having its length extending in the lateral direction of said wheel elements, and means for rotating said wheels and said fairing together with respect to the aircraft about said vertical axis from the landing position of said wheels in which said fairing extends transversely to offer its maximum resistance to flight, to a position in which said wheels are inoperatively disposed transverse to the direction of flight and said fairing is disposed in a position of least resistance to forward flight.

12. In aircraft, ground-engaging means rotatably supported from the aircraft, an elongated streamlined fairing disposed about said ground-engaging means, the length of said fairing disposed substantially co-directional with a first axis of rotation of said ground-engaging means, and means for rotating said ground-engaging means and said fairing about an axis substantially normal to said first axis of rotation.

13. In aircraft, rotatable ground-engaging means, an elongated streamlined fairing concentrically disposed about said ground-engaging means, the length of said fairing disposed substantially co-directional with the axis of rotation of said ground-engaging means, and means for rotating said ground-engaging means and said fairing within a substantially horizontal plane from an operative position of said ground-engaging means in which said fairing is disposed transversely in a drag-producing position to an inoperative position of said ground-engaging means in which said fairing is headed into the direction of flight in a drag-reducing position.

14. In aircraft, horizontally rotatable ground-engaging means, an elongated streamlined fairing concentrically disposed about said ground-engaging means, the length of said fairing disposed substantially co-directional with the axis of rotation of said ground-engaging means, said fairing having an opening through the bottom portion thereof, skid means mounted for rotation about said horizontal axis of rotation of said ground-engaging means, and means for extending said skid means from a retracted position alongside said ground-engaging means and within said fairing to an extended operative position beneath said ground-engaging means and within said fairing opening.

15. In aircraft, rotatable ground-engaging means, an elongated streamlined fairing of substantially circular cross-section concentrically disposed about said ground-engaging means, the length of said fairing disposed substantially co-directional with the axis of rotation of said ground-engaging means, said fairing having an opening through the bottom portion thereof, skid means mounted for rotation about said axis of rotation of said ground-engaging means, means for extending said skid means from a retracted position alongside said ground-engaging means and within said fairing to an extended operative position beneath said ground-engaging means and within said fairing opening, and means for raising said fairing with respect to said skid means for increasing the relative projection of said skid means in its operating position beneath said fairing.

ALVIN C. SMITH.

REFERENCES CITED

The following references are of record in the file of this patent:

UNITED STATES PATENTS

| Number | Name | Date |
| --- | --- | --- |
| 1,810,054 | Miller | June 16, 1931 |
| 1,834,427 | Schumacher | Dec. 1, 1931 |
| 2,069,994 | Butler | Feb. 9, 1937 |
| 2,092,204 | Brown | Sept. 7, 1937 |
| 2,402,428 | Mitten | June 18, 1946 |
| 2,460,506 | Jamison | Feb. 1, 1949 |

FOREIGN PATENTS

| Number | Country | Date |
| --- | --- | --- |
| 491,298 | Great Britain | Aug. 30, 1938 |
| 847,813 | France | Oct. 17, 1939 |
| 71,226 | Sweden | Feb. 24, 1931 |